(12) United States Patent
Miyata

(10) Patent No.: US 8,614,817 B2
(45) Date of Patent: Dec. 24, 2013

(54) COMPUTER READABLE MEDIUM HAVING PRINT CONTROL PROGRAM, PRINT CONTROLLER AND COMPUTER EXECUTABLE METHOD USING THE PRINT CONTROL PROGRAM

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 595 days.

(21) Appl. No.: 12/952,818

(22) Filed: Nov. 23, 2010

(65) Prior Publication Data

US 2011/0128577 A1 Jun. 2, 2011

(30) Foreign Application Priority Data

Nov. 27, 2009 (JP) ................. 2009-270530

(51) Int. Cl.
*G06F 3/12* (2006.01)
(52) U.S. Cl.
USPC ......... 358/1.15; 358/1.18; 358/1.1; 358/1.12; 358/1.14; 358/1.13; 358/400; 358/498; 358/538; 358/530; 382/162; 382/167; 382/276; 382/302
(58) Field of Classification Search
None
See application file for complete search history.

(56) References Cited

U.S. PATENT DOCUMENTS

| 7,689,461 | B2 | 3/2010 | Minowa | |
| 7,812,996 | B2 * | 10/2010 | Sakamoto | 358/1.18 |
| 2005/0271446 | A1 | 12/2005 | Minowa | |
| 2006/0001896 | A1 | 1/2006 | Sakamoto | |
| 2007/0247651 | A1 | 10/2007 | Maehira | |

FOREIGN PATENT DOCUMENTS

| JP | H05-019472 | * | 9/1984 |
| JP | 2001-047683 | | 2/2001 |
| JP | 2005-335125 A | | 12/2005 |
| JP | 2006-018748 A | | 1/2006 |
| JP | 2007-293427 | | 11/2007 |

OTHER PUBLICATIONS

JP Office Action dated Sep. 13, 2011, corresponding JP Application No. 2009-270530; English Translation.

* cited by examiner

*Primary Examiner* — Paul F Payer
(74) *Attorney, Agent, or Firm* — Banner & Witcoff, Ltd.

(57) ABSTRACT

A computer readable medium having a computer program product stored thereon configures a print controller to perform as a generation section, a storing section, a determination section and an execution section. The generation section is configured to generate a print command based on printing object data that is sequentially input. The storing section is configured to store the print command in a memory without outputting to an image forming section. The determination section is configured to determine which one of processing including outputting, deleting and keeping storing is executed for the stored print command based on a content of printing object data that is input after the printing object data for which the print command has been generated. The execution section is configured to execute the processing that is determined by the determination section for the stored print command.

17 Claims, 9 Drawing Sheets

COMPUTER READABLE MEDIUM HAVING PRINT CONTROL PROGRAM, PRINT CONTROLLER AND COMPUTER EXECUTABLE METHOD USING THE PRINT CONTROL PROGRAM

CROSS REFERENCE TO RELATED APPLICATION

The present application claims priority from Japanese Patent Application No. 2009-270530 filed on Nov. 27, 2009. The entire content of this priority application is incorporated herein by reference.

TECHNICAL FIELD

The present disclosure relates to a computer readable medium having a print control program, a print controller and a computer executable method for controlling a printing operation.

BACKGROUND

There has been known a program of a device driver that determines whether a processing of a stored (hold) print command is executed or not based on determination whether there exists a next print page or not.

According to the program of the device driver, image data of one page is divided into several parts. After transmission of the front half of the image data to the image recording device, transmission of a next page presence command (print command) or transmission of the last half of the image data (print command) are holding. When the processing of the page is executed, it is determined whether there exists a page that has been processed before the page (whether the number of processed pages is one or more). If there exists a processed page, it is determined that a next page exists (the page that is currently processed corresponds to the next page), and after the transmission of the next page presence command, the last half of the image data of the processed page is transmitted.

However, according to the conventional program of the device driver, the determination whether the stored print command is output or not, that is, the determination whether the processing of the stored print command is executed or not is determined based on only the number of printed pages. Therefore, appropriate determination may not be made.

SUMMARY

According to an aspect of the present invention, a computer readable medium having a computer program product stored thereon for configuring a print controller to perform as a generation section, a storing section, a determination section and an execution section. The generation section is configured to generate a print command based on printing object data that is sequentially input. The storing section is configured to store the print command in a memory without outputting to an image forming section. The determination section is configured to determine which one of processing including outputting, deleting and keeping storing is executed for the stored print command based on a content of printing object data that is input after the printing object data for which the print command has been generated. The execution section is configured to execute the processing that is determined by the determination section for the stored print command.

BRIEF DESCRIPTION OF THE DRAWINGS

Illustrative aspects in accordance with the present invention will be described in detail with reference to the following drawings wherein.

DETAILED DESCRIPTION

<Illustrative Aspect>

An illustrative aspect of the present invention will be hereinafter explained with reference to FIGS. 1 to 9.

(1) Printing System

Figure 1:
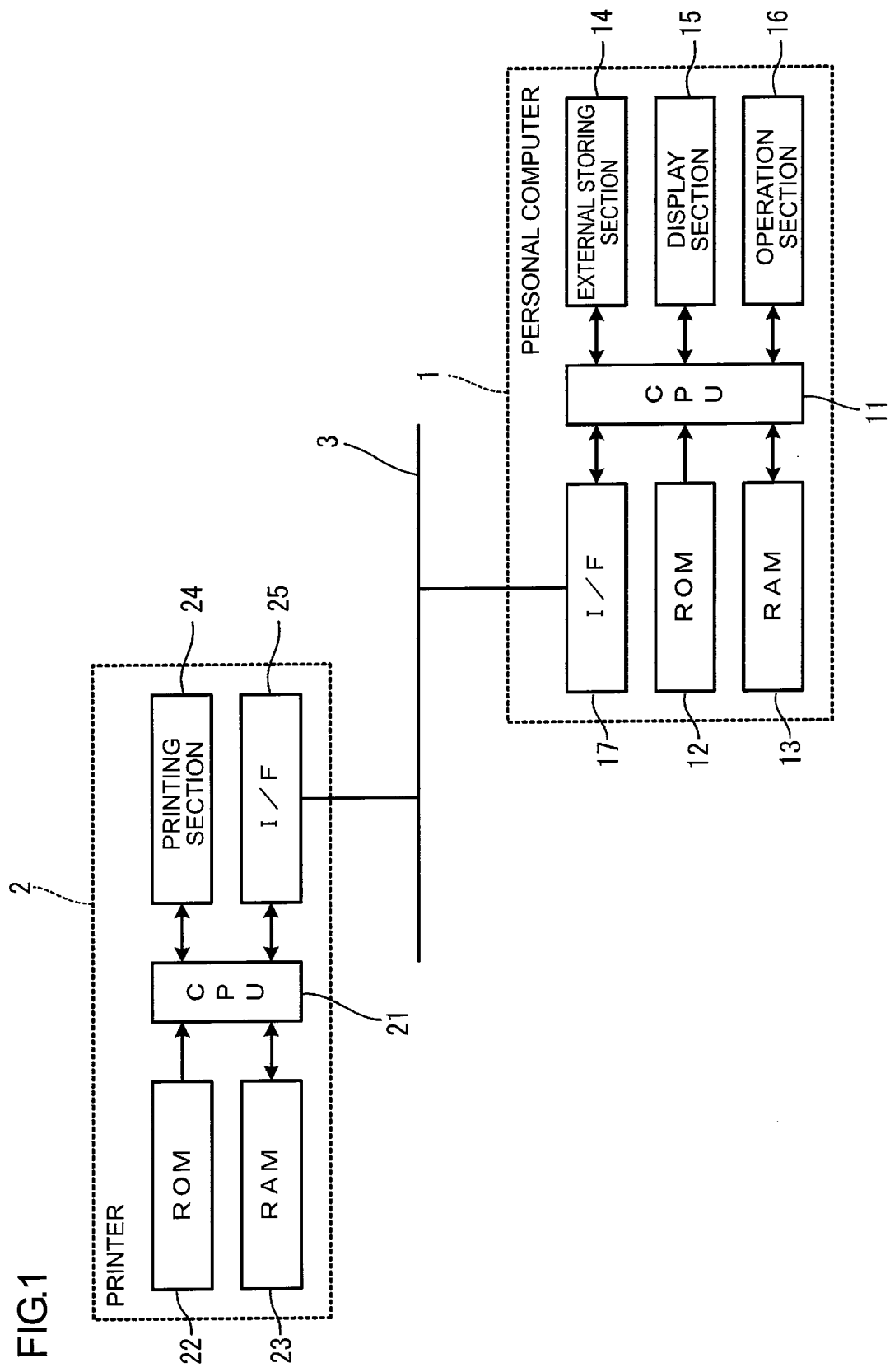
FIG. 1 is a block diagram illustrating a print controller and an image forming section according to an illustrative aspect of the present invention.

As illustrated in FIG. 1, a personal computer 1 (a computer, one example of a print controller, and hereinafter referred to as a PC) and a printer 2 (one example of an image forming section) are connected to each other via a communication network 3 such as a LAN (Local Area Network) to enable mutual data communication.

(1-1) Electrical Configuration of PC

The PC 1 includes a CPU 11 (one example of a generation section, a storing (holding) section, a determination section, a processing determination section, an inquiry section, an execution section), a ROM 12, a RAM 13 (one example of a buffer), an external storing section 14, a display section 15, an operation section 16 and a network interface (I/F) 17.

The CPU 11 executes various computations based on programs stored in the ROM 12 and the storing section 14 and controls each component in the PC 1. The ROM 12 stores various programs that are executed by the CPU 11 and data. The RAM 13 is a main memory that is used when the CPU 11 executes various processes and also is a buffer for storing (holding) print commands.

The external storing section 14 is an external memory for storing various programs and data using a non-volatile storing medium such as a hard disk or a flash memory. The external storing section 14 stores an operating system (OS), a printer driver for the printer 2 (an example of a print control program), printing object information (any information that can be printed such as a text, a chart, an image, an illustration and a photo) and various application programs that are used to output a command for printing the printing object information to the printer driver via an OS.

The display section 15 is comprised of a display device such as a CRT or a liquid crystal display.

The operation section 16 is comprised of a mouse or a keyboard.

The network interface (I/F) 17 is connected to external devices such as the printer 2 via the communication network 3. The PC 1 may be configured to be directly connected to the printer 2 via an USB or RS-232C, for example.

(1-2) Electrical Configuration of Printer

The printer 2 includes a CPU 21, a ROM 22, a RAM 23, a printing section 24 and a network interface (I/F) 25.

The CPU 21 controls each component in the printer 2 based on various programs stored in the ROM 22. The ROM 22 stores various programs and data used at the time of a control operation by the CPU 21. The RAM 23 is a main memory used when the CPU 21 executes various processing.

The printing section 24 forms images on a recording medium such as a paper based on a print command by a laser method, an LED method or an ink jet method.

The network interface (I/F) 25 is connected to an external device such as the PC 1 via the communication network 3.

(2) Logical Configuration of Printer Driver

Figure 2:
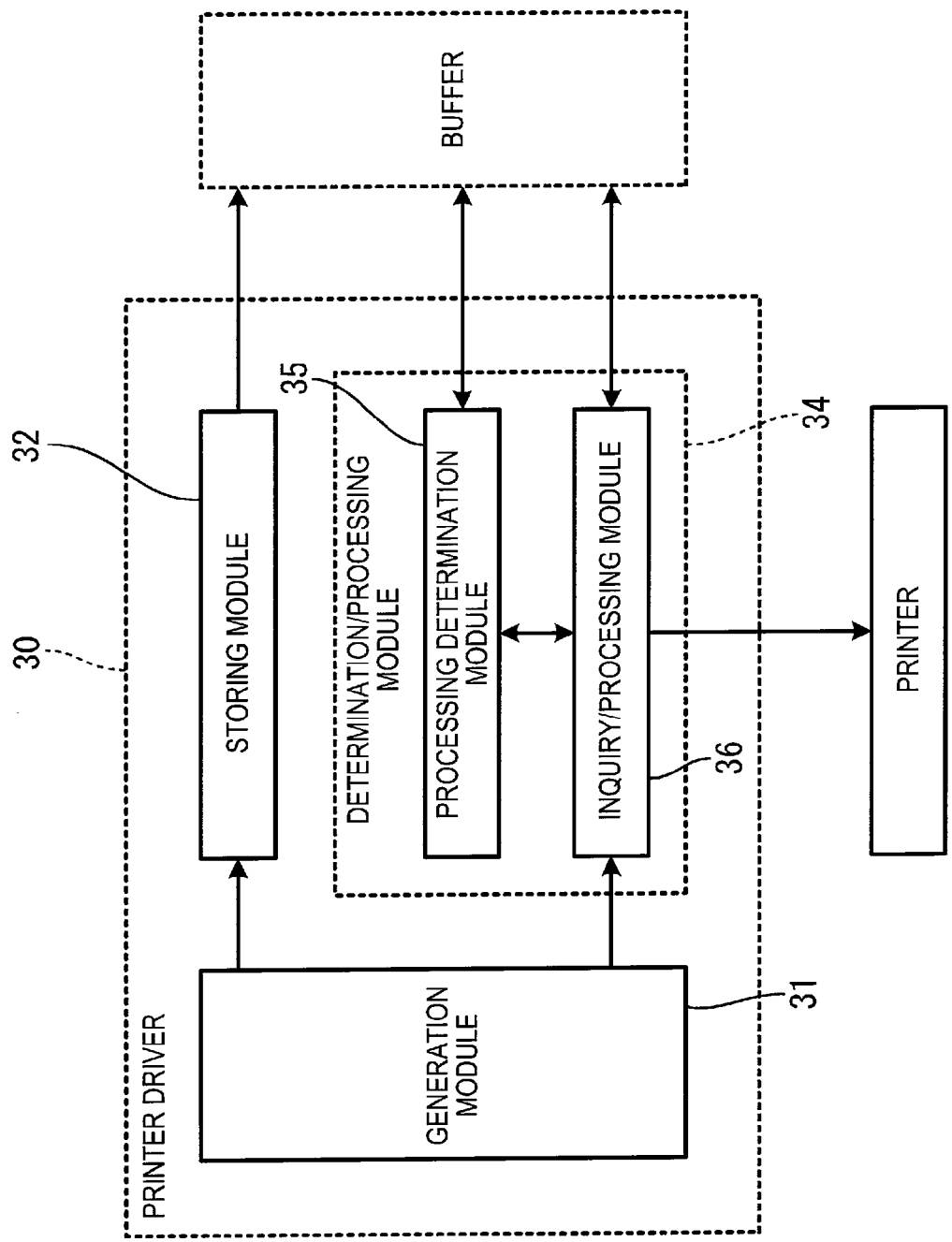
FIG. 2 is a block diagram illustrating a logical configuration of a printer driver.

As illustrated in FIG. 2, the printer driver 30 includes a generation module 31, a storing (holding) module 32 and a determination/processing module 34. The determination/processing module 34 includes a processing determination module 35 and an inquiry/processing module 36. The CPU 11 functions as a generation section according to the generation module 31, functions as a storing section according to the storing module 32, and functions as a determination/processing section according to the determination/processing module 34. Further, the CPU 11 functions as a processing determination section according to the processing determination module 35 and functions as an inquiry/processing section according to the inquiry/processing module 36.

In the present illustrative aspect, the printing object information is bit map data (raster data), however, it may be vector data. The printing object information may be comprised of a plurality of pages. According to the OS, the printing object information is input to the printer driver 30 sequentially by a predetermined number of lines (for example, one line) for every page. The page including the predetermined number of lines that is input at one time is an example of the printing object data.

(2-1) Generation Section (Generation Module)

According to the generation module 31, the generation section generates a print command based on the printing object data that is sequentially input and transmits the generated print command to the storing section.

"Based on the printing object" here means that based on the printing object data itself, based on the input of the printing object data, based on completion of the input of the printing object data, based on a total data amount of the printing object data or a total number of printing object data (a total number of lines) that has been input, or based on changing of the page that is represented by the printing object data. "Generating a print command" here includes reading a print command that is previously stored in the ROM 12.

Figure 3:
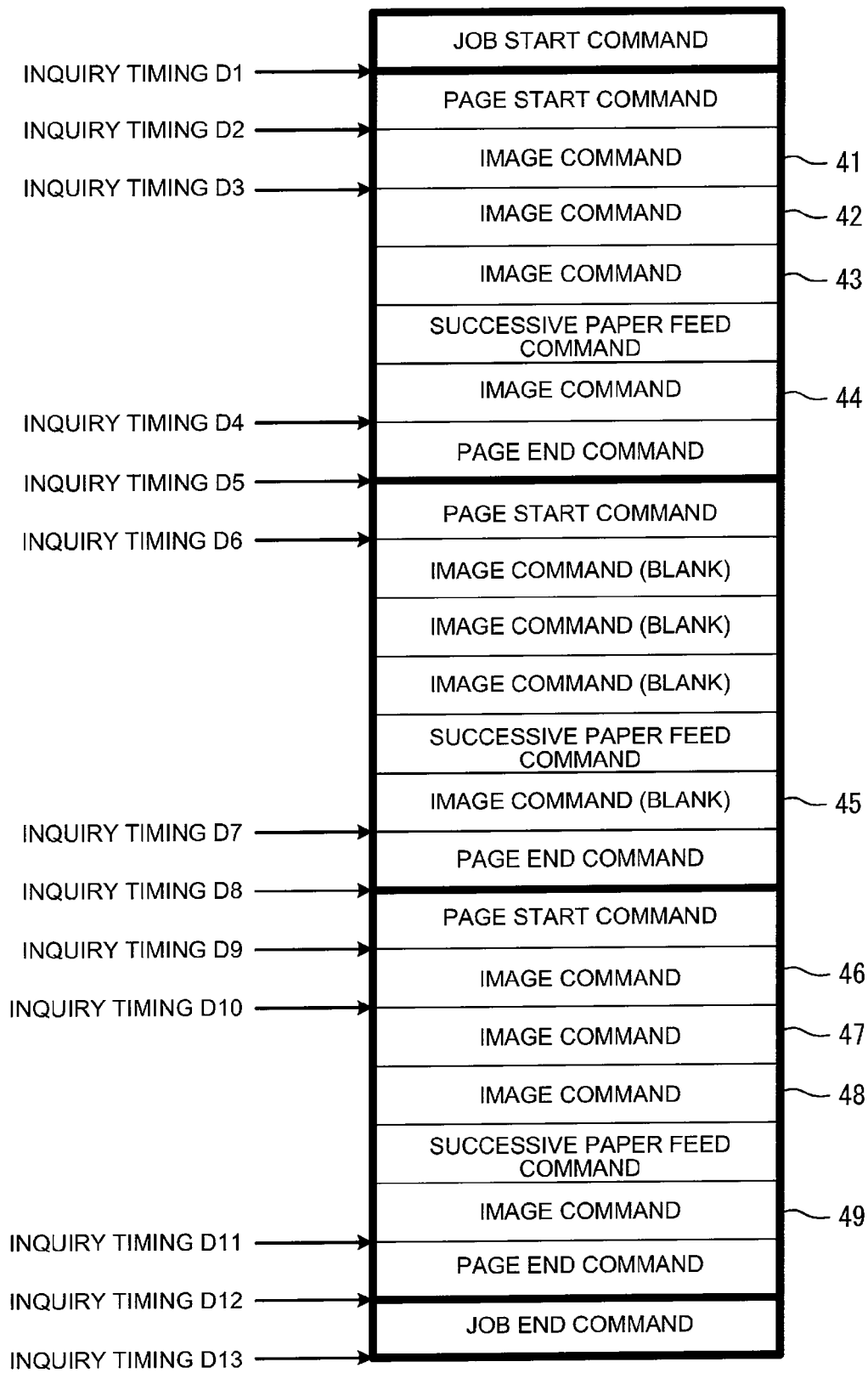
FIG. 3 is a diagram illustrating examples of print commands generated according to a generation module.

With reference to FIG. 3, an example of printing object information comprising three pages will be explained.

A job start command is a print command that informs the printer 2 of a start of a print job. A job end command is a print command that informs the printer 2 of an end of the print job. The job start command and the job end command are output determined commands that are determined to be output to the printer 2.

A page start command, an image command and a page end command are print commands that are generated for every page. The generation section defines a page into a plurality of areas to be processed to save an occupied area of the RAM 13. When a first line of the page is input, the page start command is generated, and thereafter, every time that a line corresponding to one defined area is input, the image command representing the area is generated. After the input of all the lines of the page, the page end command is generated.

If the page is a blank page (no dot is formed on a recording medium), the CPU 11 controls the printer driver 30 to execute no processing for the page not to transfer a recording medium in vain. The CPU 11 cannot determine whether the page is a blank page or not until all the lines of the page are input. Therefore, at the timing of generating the page start command or the image command (except for the image command in the last area), the CPU 11 cannot determine whether the page is a blank page or not. After generation of the page start command, the image command and the page end command, the CPU 11 controls the printer driver 30 to temporally store (hold) the commands in the buffer without outputting to the printer 2. When determining that the page is a blank page, the CPU 11 controls the printer driver 30 to delete the print commands without outputting them to the printer 2. Therefore, the page start command, the image command and the page end command are output undetermined commands that are not determined to output to the printer 2.

A successive paper feed command instructs the printer 2 to start feeding of a recording medium on which a next page of the currently processed page is to be printed. Namely, the successive paper feed command makes the recording medium to be successively fed. According to the generation module 31, the generation section generates a successive paper feed command during the processing of the currently processed page (while the print command of the page is being generated) so as to promptly start printing of the next page after completion of printing of the currently processed page. Specifically, the generation section generates a successive paper feed command before the last area. Timing for generating the successive paper feed command is appropriately and selectively determined.

The CPU 11 controls the printer driver 30 not to output a successive paper feed command and not to feed a recording medium in vain if there exists no next page. Since the CPU 11 cannot determine via the printer driver 30 whether there exists a next page or not until a line of the next page is input via the OS, the CPU 11 cannot determine the presence of a next page during the processing of a page. The CPU 11 controls the printer driver 30 to generate a successive paper feed command and store the command in the buffer without outputting to the printer 2. If determining that there exists no next page, the CPU 11 does not output the generated successive paper feed command to the printer 2 and deletes it. Therefore, the successive paper feed command is an output undetermined command that is not determined to be output to the printer 2.

The next page described in the above explanation of the successive paper feed command does not include a blank page. If the next page is a blank page, the CPU 11 determines that there exists no page. Therefore, if the next page is a blank page, the CPU 11 determines whether to output the successive paper feed command based on the determination whether there is a further succeeding page.

The successive paper feed command is generated also during the processing of a blank page. However, the successive paper feed command generated during the processing of the blank page is not output to the printer 2 like the page start command and deleted.

(2-2) Storing Section (Storing Module)

According to the storing module 32, the storing section outputs the print command generated by the generation section or stores the print command in the buffer without outputting to the printer 2.

If the generated print command is an output undetermined command, according to the storing module 32, the storing section stores the print command in the buffer without outputting to the printer 2.

If the generated print command is an output determined command, the storing section determines whether a print command is stored in the buffer. If determining that no print command is stored in the buffer, the storing section outputs the output determined command to the printer 2, and if determining that a print command is stored in the buffer, the storing section stores the output determined command in the buffer. Even the output determined command is not output to the printer 2 and stored in the buffer if a print command is stored in the buffer. This is because the output determined command is not output to the printer 2 before output of the print command that has been stored in the buffer. After all the print commands stored in the buffer are erased from the buffer by output to the printer 2 or deletion, the output determined command is output to the printer automatically.

Figure 4:
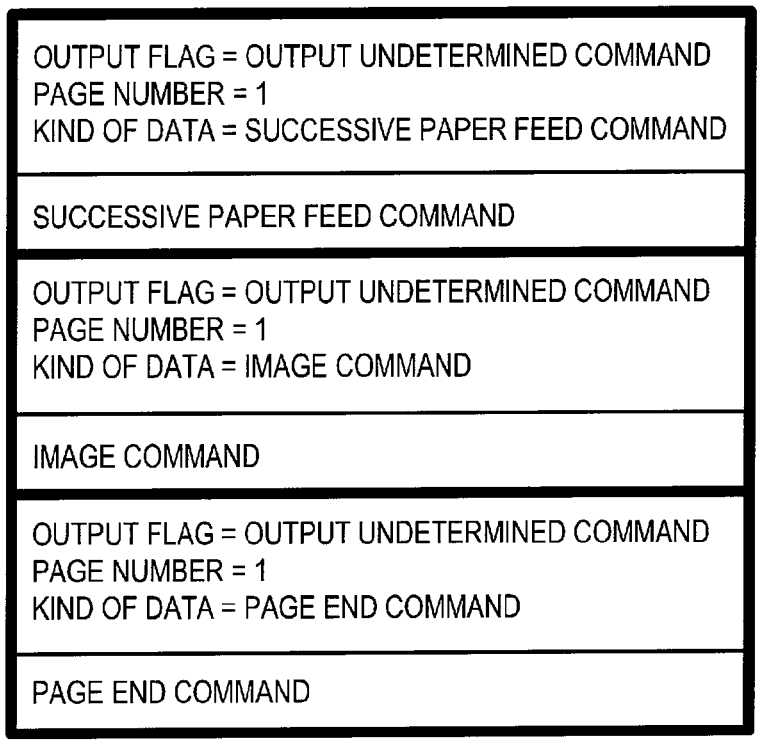
FIG. 4 is a diagram illustrating examples of print commands stored in a buffer.
Figure 5:
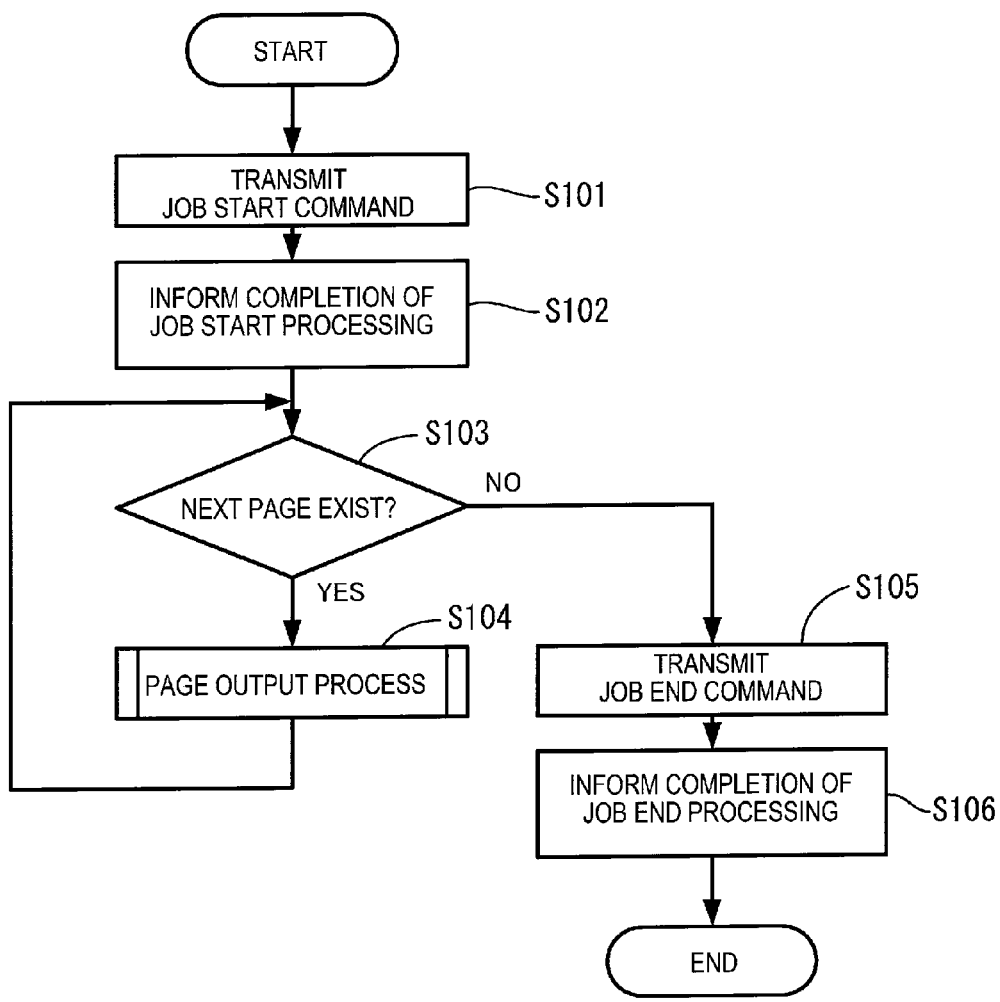
FIG. 5 is a flowchart illustrating an entire process of the generation module.

As illustrated in FIG. 4, various information is added to a print command and the print command is stored in the buffer according to the storing module 32. Different information is added to the print command in case that the print command is an output undetermined command and in case that the print command is an output determined command. When the print command is an output undetermined command, information representing an output flag, a page number and a kind of command (an example of a command identifier) is added to the print command, and when the print command is an output determined command, information of an output flag is added to the print command.

The output flag is information that identifies the print command as an output determined command or an output undetermined command.

The page number represents a page number of the page for which the print command is generated.

The kind of command represents that the print command corresponds to which one of a page start command, an image command, a successive paper feed command or a page end command.

(2-3) Determination/Processing Section (Determination/Processing Module)

The determination/processing module 34 includes the processing determination module 35 and the inquiry/processing module 36.

According to the processing determination module 35, the processing determination section receives an inquiry about processing that should be carried out for the print command stored in the buffer. Then, the processing determination section determines which one of the processing including outputting, deleting and keeping storing is executed for the inquired print command based on determination whether there exist printing object data that is input after the printing object data for which the inquired print command is generated. Further, if determining that there exists printing object data that is input after the printing object data for which the inquired print command is generated, the processing determination section determines which one of the processing is exectued for the inquired print command based on a content of the printing object data input thereafter.

According to the inquiry/processing module 36, the inquiry/processing section inquiries of the processing determination section which one of the processing is executed for the output undetermined commands among the print commands stored in the buffer sequentially from a top print command. The inquiry/processing section executes the processing for the print command that is determined according to the determination result made by the processing determination section.

Inquiry timings D1 to D13 illustrated in FIG. 3 represent timings when the inquiry/processing section inquires of the processing determination section about the processing for print commands. Each of the inquiry timings D1 to D13 is set every time when a print command that is different from the previously generated print command is generated.

An inquiry is not made for an image command in principle, if its immediately preceding print command is an image command. Also, if the immediately preceding print command is a print command other than an image command (specifically, a page start command), an inquiry is not made in principle. "In principle" is used here, because an inquiry is made for an image command after a first line that is not a blank line is input or after a last image command of a page is generated. An inquiry is not made for a successive paper feed command if its immediately preceding print command is a print command that is not a successive paper feed command. This is because that the determination of processing for the stored (hold) print command is not changed even if a successive paper feed command is generated.

(3) Process of Each Module

A process of each module and operations of each section of the CPU 11 according to the corresponding module will be explained.

(3-1) Generation Module and Generation Section (3-1-1) Entire Process

When a user provides a print command with an application program, the print command is transmitted to the printer driver 30 from the OS. This process is started in response to the print command. An entire process of the generation module 31 will be explained with reference to FIG. 5.

At step 101, the generation section transmits a job start command to the storing section.

At step 102, the generation section informs the determination/processing section of completion of a job start processing. The completion of a job start processing represents that a processing of transmitting a job start command to the storing section is completed. This is also same in the following description.

At step 103, the generation section determines whether there exists a next page (whether there is a first page when this process is just started). If the generation section determines that there exists a next page, the process proceeds to step 104 and if the generation section determines that there exists no next page, the process proceeds to step 105.

At step 104, the generation section executes a page output processing to generate a print command for every page. Details of the page output processing will be explained later.

At step 105, the generation section transmits a job end command to the storing section.

At step 106, the generation section informs the determination/processing section of completion of a job end processing.

(3-1-2) Page Output Processing

Figure 6:
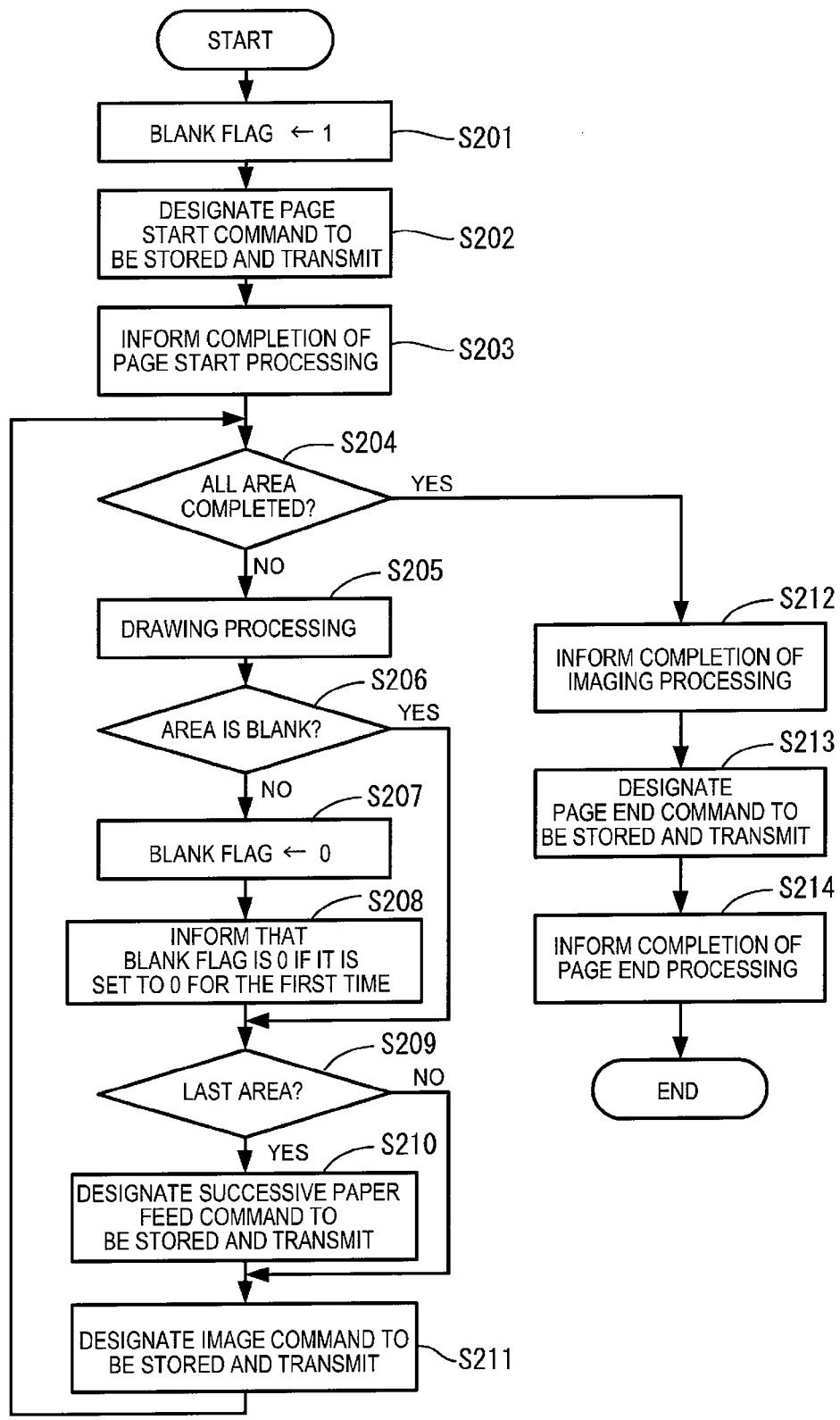
FIG. 6 is a flowchart illustrating a page output process.

The page output processing will be explained with reference to FIG. 6.

At step 201, the generation section sets a blank flag to 1 as an initial value. The blank flag set to 1 represents that the currently processed page is a blank page. The blank flag is a variable that is stored for each page.

At step 202, the generation section designates the page start command to be stored in the buffer and transmits the designated page start command to the storing section. An operation in that a print command is designated to be stored and transmitted means an operation in that the print command is designated to be stored in the buffer and transmitted.

When transmitting the print command with being designated to be stored, the generation section also transmits the above-described various information to the storing section. The generation section sets following values to the above-described various information. The output flag is set to an output undetermined command and the page number is set to a page number of the currently processed page and the kind of command is set to a page start command. The generation section transmits the information to the storing section.

At step 203, the generation section informs the determination/processing section of the completion of the page start processing.

At step 204, the generation section determines whether processing is completed for all areas of the page. If the generation section determines that processing is not completed for all areas, the process proceeds to step 205 and if the generation section determines that processing is completed for all areas, the process proceeds to step 212.

At step 205, the generation section executes drawing processing for the currently processed area. In the drawing processing, the generation section draws characters or figures included in the printing object data and various image processing (for example, gamma correction or color space conversion) is executed for the data in the area, and the generation section generates binary images (half tone data) based on the processed data for every color. The binary images represent dot patterns formed by the printer 2.

At step 206, the generation section determines whether the currently processed area is a blank (all the dots are white). If the generation section determines that it is not a blank, the process proceeds to step 207, and if the generation section determines that it is a blank, the process proceeds to step 209.

At step 207, the generation section sets the blank flag of the currently processed page to 0 representing that the page is not a blank page.

At step 208, the generation section informs the determination/processing section that the blank flag is set to 0. The informing that the blank flag is set to 0 is made only once when the blank flag of the currently processed page is set to 0.

At step 209, the generation section determines whether the currently processed area is a last area. If the generation section determines that it is a last area, the process proceeds to step 210 and if the generation section determines that it is not a last area, the process proceeds to step 211.

At step 210, the generation section designates the successive paper feed command to be stored and transmits the designated command to the storing section and also transmits the various information including the following values to the storing section. The output flag is set to an output undetermined command, the page number is set to a page number of the currently processed page, and the kind of command is set to a successive paper feed command.

At step 211, the generation section generates an image command representing the data in the area for which the drawing processing is executed. The generation section designates the generated image command to be stored and transmits the designated image command to the storing section and also transmits the various information including the following values to the storing section. The output flag is set to an output undetermined command, the page number is set to a page number of the currently processed page, and the kind of command is set to an image command.

This process returns to step 204.

At step 212, the generation section informs the determination/processing section of the completion of the drawing processing.

At step 213, the generation section designates the page end command to be stored and transmits the designated page end command to the storing section and also transmits the various information including the following values to the storing section. The output flag is set to an output undetermined command, the page number is set to a page number of the currently processed page, and the kind of command is set to a page end command.

At step 214, the generation section informs the determination/processing section of the completion of the page end processing, and the process returns to step 103 in the entire process.

(3-2) Storing Module and Storing Section

Figure 7:
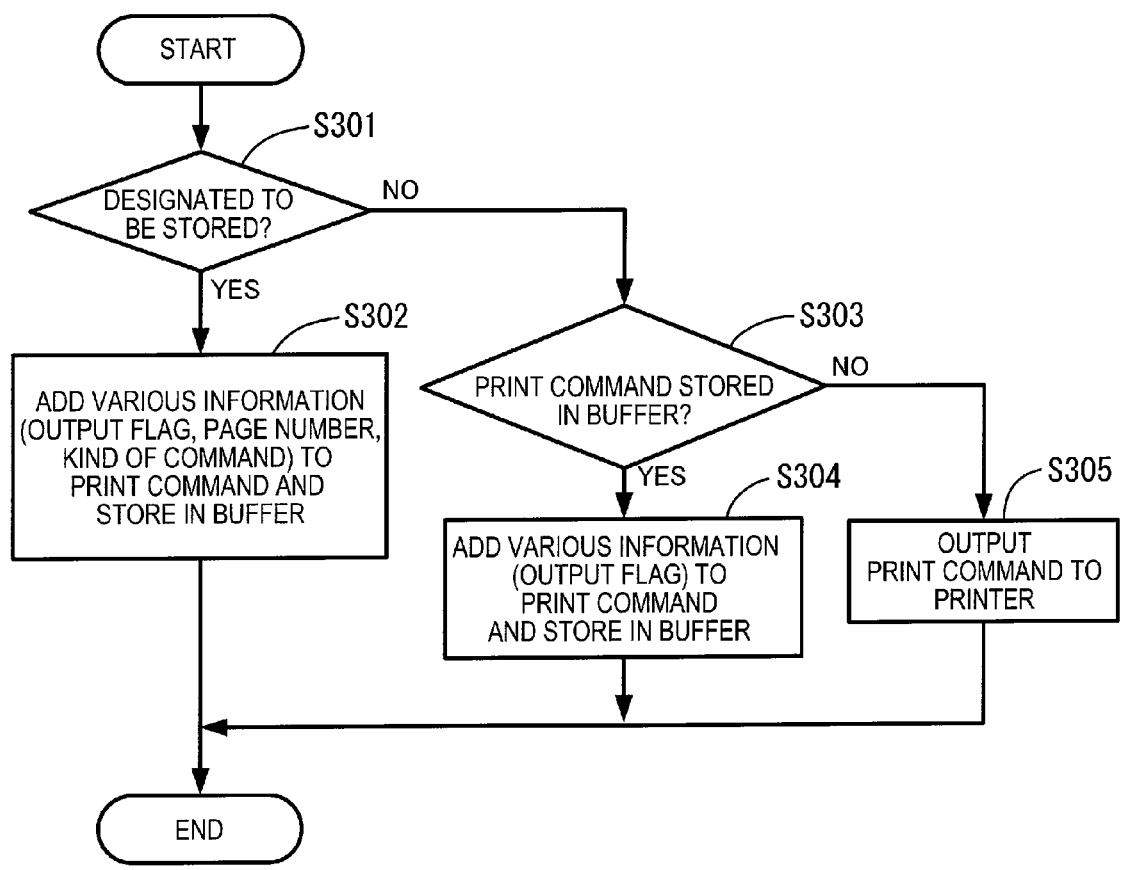
FIG. 7 is a flowchart illustrating a process of a storing module.

A process of the storing module will be explained with reference to FIG. 7. This process is started when the storing section receives a print command that is transmitted from the generation section.

At step 301, the storing section determines whether the print command transmitted from the generation section is designated to be stored. If the storing section determines that it is designated to be stored, the process proceeds to step 302, and if the storing section determines that it is not designated to be stored, the process proceeds to step 303.

At step 302, the storing section adds various information (the output flag, the page number, the kind of command) to the transmitted print command and stores it in the buffer.

At step 303, the storing section determines whether a print command is stored in the buffer. If the storing section determines that it is stored in the buffer, the process proceeds to step 304 and if the storing section determines that it is not stored in the buffer, the process proceeds to step 305.

At step 304, the storing section adds the various information (the output flag) to the transmitted print command and stores it in the buffer. The output flag is set to an output determination command.

At step 305, the storing section outputs the transmitted print command to the printer 2.

(3-3) Inquiry/Processing Module and Inquiry/Processing Section

Figure 8:
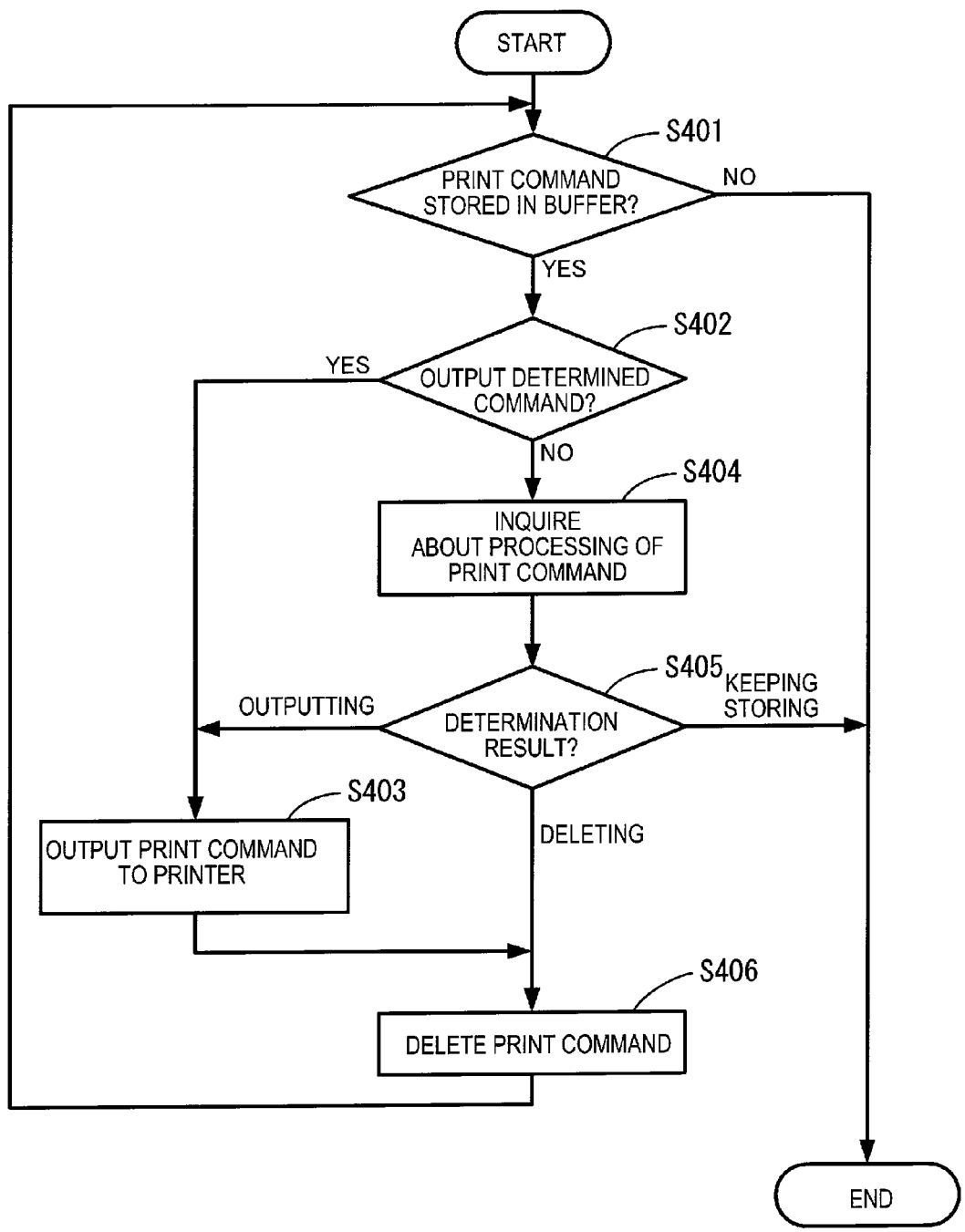
FIG. 8 is a flowchart illustrating a process of an inquiry/processing module.

A process of the inquiry/processing module will be explained with reference to FIG. 8. This process is started every time completion of each processing is informed by the generation section.

At step 401, the inquiry/processing section determines whether a print command is stored in the buffer. If the inquiry/processing section determines that it is stored in the buffer, the process proceeds to step 402, and if the inquiry/processing section determines that it is not stored in the buffer, the process is terminated.

At step 402, the inquiry/processing section selects a top print command among the print commands stored in the buffer and determines whether the selected print command is an output determined command (specifically, the job end command) with referring to the output flag. If the inquiry/processing section determines that the selected print command is an output determined command, the process proceeds to step 403, and if the inquiry/processing section determines that it is not the output determined command, the process proceeds to step 404.

At step 403, the inquiry/processing section outputs the selected print command to the printer 2.

At step 404, the inquiry/processing section inquires of the processing determination section which one of the processing is executed for the selected print command.

At step 405, the inquiry/processing section receives a determination result made by the processing determination section. If the determination result is outputting, the process proceeds to step 403, and if the determination result is deletion, the process proceeds to step 406, and if the determination result is keeping storing, the process is terminated.

If the determination result is keeping storing, the process is terminated such that the print command stored after the print command for which the determination result is keeping storing is not output prior to the print command for which the determination result is keeping storing. If completion of processing is informed from the generation section after the termination of the process due to the determination result of keeping storing, this process according to the inquiry/processing module is started again and the inquiry is made again for the print commands stored in the buffer sequentially from a top one.

At step 406, the inquiry/processing section deletes the selected print command from the buffer.

(3-4) Processing Determination Module and Processing Determination Section

Figure 9:
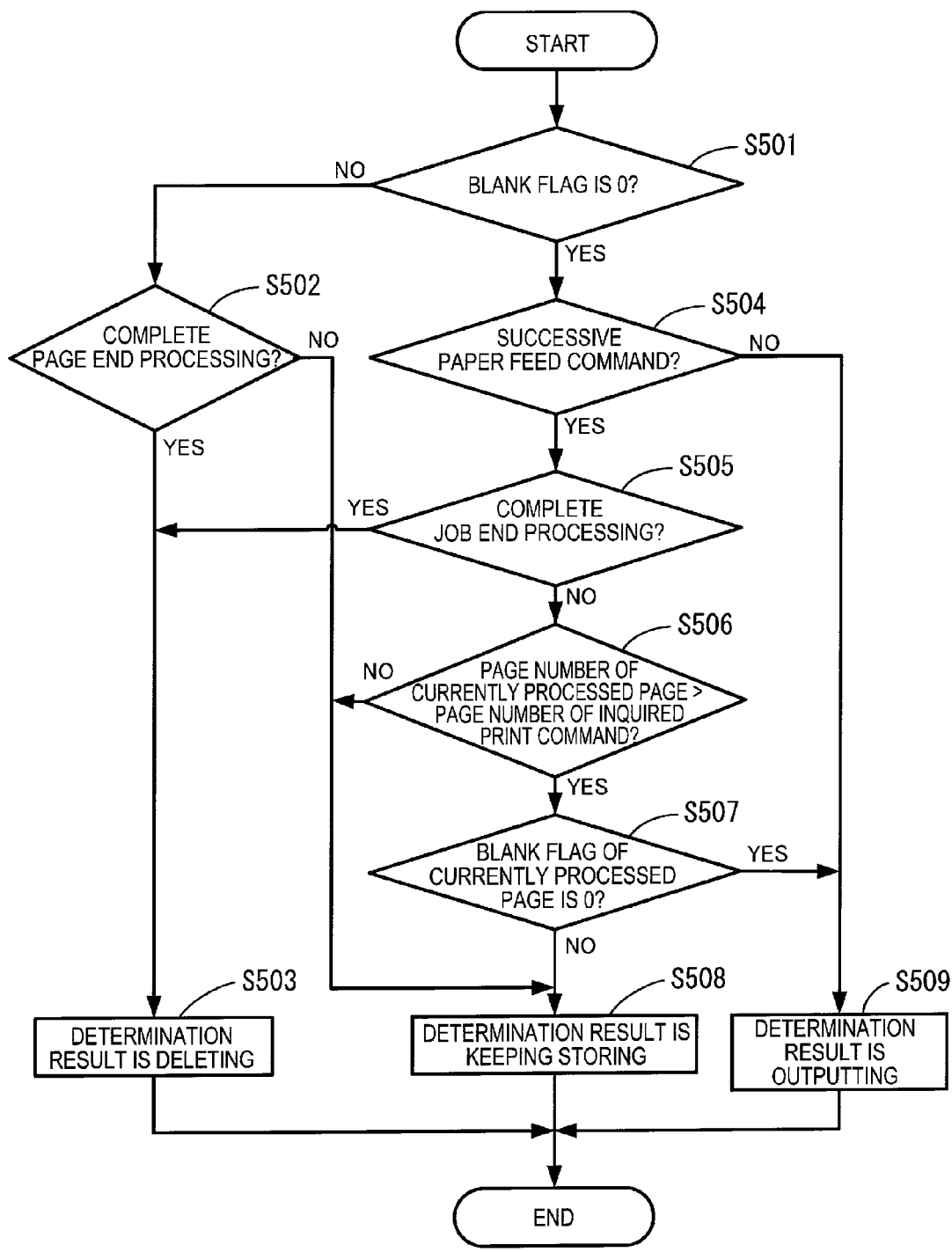
FIG. 9 is a flowchart illustrating a process of a processing determination module.

A process of the processing determination module will be explained with reference to FIG. 9. This process is executed every time the inquiry/processing section inquires which one of the processing is executed for the print command.

At step 501, the processing determination section determines whether the blank flag of the page corresponding to the page number of the inquired print command is 0. If it is determined that the blank flag is 1, the process proceeds to step 502 and if it is determined that the blank flag is 0, the process proceeds to step 504.

At step 502, the processing determination section determines whether the page end processing of the page for which the inquired print command is generated is completed. If it is determined that the blank flag is 1 and the page end processing is completed, the page for which the inquired print command is generated is a blank page. Therefore, if determining that the page end processing is completed, the processing determination section determines to delete the inquired print command and the process proceeds to step 503. If determining that the page end processing is not completed, the processing determination section cannot determine whether or not the page is a blank page at this point. Therefore, the processing determination section determines that the determination result is keeping storing and the process proceeds to step 508.

At step 503, the processing determination section transmits the determination result of deleting to the inquiry processing section.

At step 504, the processing determination section determines whether or not the kind of inquired print command is a successive paper feed command with reference to the information representing the kind of command. If the processing determination section determines that the inquired print command is a successive paper feed command, the process proceeds to step 505. If the processing determination section determines that the inquired print command is not a successive paper feed command (it is a page start command, an image command or a page end command), the processing determination section determines that the determination result is outputting since it is determined in step 501 that the page for which the print command is generated is not a blank page, and the process proceeds to step 509.

At step 505, the processing determination section determines whether the job end processing is completed. The completion of the job end processing means that there is no succeeding page after the page for which the inquired successive paper feed command is generated. Therefore, if determining that the job end processing is completed, the processing determination section determines that the determination result is deleting and the process proceeds to step 503. If the processing determination section determines that the job end processing is not completed, the process proceeds to step 506.

At step 506, the processing determination section determines whether the page number of the currently processed page (the page for which a print command is currently generated by the generation section) is greater than the page number of the inquired successive paper feed command. If it is determined that the page number of the currently processed page is greater than the page number of the successive paper feed command, it is sure that there exists a next page although it is not sure whether the next page is a blank page. Therefore, the process proceeds to step 507. If it is determined that the page number of the currently processed page is equal to or smaller than the page number of the successive paper feed command, it is not sure at this point whether there exists a next page. Therefore, the processing determination section determines that the determination result is keeping storing and the process proceeds to step 508.

At step 507, the processing determination section determines whether the blank flag of the currently processed page is 0. If determining that the blank flag is 1, it is not sure at this point whether the next page is a blank page. Therefore, the processing determination section determines that the determination result is keeping storing and the process proceeds to step 508. If determining that the blank flag of the currently processed page is 0, it is sure that the next page is not a blank page. Therefore, the processing determination section determines that the determination result is outputting and the process proceeds to step 509.

At step 508, the processing determination section transmits the determination result of keeping storing to the inquiry/processing section.

At step 509, the processing determination section transmits the determination result of outputting to the inquiry/processing section.

(4) Example of Determination by Determination/Processing Section

An example of determination by the determination/processing section will be explained with reference to the print commands illustrated in FIG. 3.

At the inquiry timing D1, no print command is stored in the buffer. The job start command is an output determined command and no print command is stored in the buffer when the job start command is generated. Therefore, the job start command is not stored in the buffer and output to the printer 2. Since no print command is stored in the buffer, any determination is not made at this timing.

At the inquiry timing D2, a page start command of a first page is stored in the buffer. At this timing, the blank flag of the currently processed page (first page) is 1 and the page end processing of the first page is not completed. Therefore, it is determined that the determination result of the page start command of the first page is keeping storing.

At the inquiry timing D3, the page start command of the first page and a first image command 41 of the first page are stored in the buffer. At this timing, the blank flag of the currently processed page (first page) is 0, and therefore it is determined that the determination results of the page start command of the first page and the first image command 41 of the first page are outputting.

At the inquiry timing D4, the print commands from a second image command 42 of the first page to a fourth image command 44 of the first page are stored in the buffer. At this timing, the blank flag of the currently processed page (first page) is 0. Therefore, it is determined that the determination results of the print commands from the second image command 42 of the first page to the third image command 43 of the first page are outputting. It is determined that the determination result of the successive paper feed command of the first page is keeping storing because the job end processing is not completed at this point and the page number of the currently processed page (first page) is equal to or smaller than the first page.

If it is determined that the determination result of any print command is keeping storing, the determination at the inquiry timing is terminated. Therefore, an inquiry is not made for the stored print command (the fourth image command 44 of the first page in this case) after the print command for which the determination result is determined to be keeping storing (the successive paper feed command of the first page in this case) and the stored print command (the fourth image command 44 of the first page in this case) is kept being storing in the buffer.

At the inquiry timing D5, the print commands from the successive paper feed command of the first page to a page end command of the first page are stored in the buffer. At this timing, the job end processing is not completed and the page number of the currently processed page (first page) is equal to or smaller than the first page. Therefore, it is determined that the determination result of the successive paper feed command of the first page is keeping storing.

At the inquiry timing D6, the print commands from the successive paper feed command of the first page to the page start command of the second page are stored in the buffer. At this timing, the page number of the currently processed page (second page) is greater than the first page. However, since the blank flag of the currently processed page (second page) is still 1 at this timing, it is determined that the determination result of the successive paper feed command of the first page is keeping storing.

At the inquiry timing D7, the print commands from the successive paper feed command of the first page to the fourth image command 45 of the second page are stored in the buffer. Since the blank flag of the currently processed page (second page) is still 1 at this timing, it is determined that the determination result of the successive paper feed command of the first page is keeping storing.

At the inquiry timing D8, the print commands from the successive paper feed command of the first page to a page end command of the second page are stored in the buffer. Since the blank flag of the currently processed page (second page) is still 1, it is determined that the determination result of the successive paper feed command of the first page is keeping storing.

At the inquiry timing D9, the print commands from the successive paper feed command of the first page to the page start command of the third page are stored in the buffer. Since the blank flag of the currently processed page (third page) is still 1 at this timing, it is determined that the determination result of the successive paper feed command of the first page is keeping storing.

At the inquiry timing D10, the print commands from the successive paper feed command of the first page to a first image command 46 of the third page are stored in the buffer. Since the blank flag of the currently processed page (third page) is 0 at this timing, it is determined that the determination result of the successive paper feed command of the first page is outputting. In such a case, it is determined that the determination results of the print commands from the successive paper feed command of the first page to the page end command of the first page are outputting. Since the second page is a blank page, it is determined that the determination results of all the print commands of the second page are deleting. Since the blank flag of the third page is 0, it is determined that the determination results of the page start command of the third page and the first image command 46 of the third page are outputting.

At the inquiry timing D11, the print commands from a second image command 47 of the third page to a fourth image command 49 of the third page are stored in the buffer. Since the blank flag of the currently processed page (third page) is 0 at this timing, it is determined that the determination results of the print commands from the second image command 47 of the third page to the third image command 48 of the third page are outputting. Since the currently processed page (third page) is equal to or smaller than the third page at this timing, it is determined that the determination result of the successive paper feed command of the third page is keeping storing.

At the inquiry timing D12, the print commands from the successive paper feed command of the third page to the page end command of the third page are stored in the buffer. Since the page number of the currently processed page (third page) is equal to or smaller than the third page at this timing, it is determined that the determination result of the successive paper feed command of the third page is keeping storing.

At the inquiry timing D13, the print commands from the successive paper feed command of the third page to a job end command are stored in the buffer. At this timing, it is determined that there exists no next page after the third page based on the generation of the job end command and it is determined that the determination result of the successive paper feed command of the third page is deleting. Since the blank flag is 0, it is determined that the determination results of the print commands from the fourth image command 49 of the third page to the page end command of the third page are outputting.

Since the job end command is an output determined command, no determination is made for it by the determination/processing section. If all the print commands previously stored in the buffer are erased there from by outputting or deleting, the job end command is automatically output.

(5) Effects of Illustrative Aspect

According to the illustrative aspect, the determination whether there exists a non-blank page on any succeeding page of the page for which the successive paper feed command is generated is made based on the printing object data that is input after the printing object data for which the successive paper feed command is generated (the printing object data on any succeeding page of the page for which the successive paper feed command is generated). Only when there exists a non-blank page on any succeeding page, the successive paper feed command is output. Therefore, compared to a case that the determination is made based on only the number of processed pages, unnecessary output of the recording medium is suppressed.

According to the illustrative aspect, concerning the page for which the successive paper feed command is generated, if all the printing object data input before the generation of the successive paper feed command is blank data, it is determined whether all the printing object data input after the generation of the successive paper feed command is blank data. If it is determined that all the printing object data input after the generation of the successive paper feed command is blank data, that is, if it is determined that the page including the printing object data is a blank page, the print commands generated for the page is not output regardless of the presence of a next page. Accordingly, compared to the case that the determination is made based on only the number of processed pages, unnecessary use of recording medium due to printing of a blank page on a recording medium is suppressed, and the successive paper feed command generated at the page is not output, and this suppresses unnecessary output of a recording medium.

According to the illustrative aspect, it is determined which processing is executed for the stored print command based on the determination whether there is printing object data input after the printing object data for which the print command is generated, and if it is determined that there is printing object input after the printing object data, the processing determination is made based on the content of the printing object data input thereafter. Therefore, compared to the case that the determination is made based on only the number of processed pages (without considering the content of the next page), the processing of the stored print command can be determined more appropriately.

According to the illustrative aspect, the processing determination for the stored print command is made by the centralized processing determination section.

There are various kinds of print commands, and the determination process for determining the processing for the stored print command is different according to the kind of print command. For example, the determination flow in case that the stored print command is a successive paper feed command is different from the determination flow in case that the stored print command is the page start command as illustrated in FIG. 9. The determination process may be defined for every kind of the print command. However, in such a case, it is necessary to determine which one of a plurality kinds of determining processes should be executed for a certain kind of print command and a great variety of kinds of print commands complicates the determination control.

According to the illustrative aspect, the processing determination is made by the centralized processing determination section. Therefore, when a print command is generated by the generation section, the inquiry/processing section only inquires of the processing determination section which one of processing should be executed and it is not necessary to control which one of determining processes should be executed for a certain print command. This simplifies control via the printer driver 30 and makes development works and maintenance works easier.

Since the information representing the kind of the command is added to the print command in storing the print command, the kind of the stored print command is easily determined.

For example, if image commands are successively generated, the inquiry is not made every time each image command is generated, and when a different kind of print command from the previously generated print command is generated, the inquiry is made. This improves processing efficiency.

According to the illustrative aspect, the processing determination section is inquired about the processing determination for the print commands stored in the buffer sequentially from the most previously stored print command. If the processing determination section determines that any one of the print commands is determined to be stored, the inquiry to the processing determination section is terminated. Therefore, the print command stored in the buffer after the print command that has been determined to be stored is not output prior to the previously stored print command. Namely, the print commands are output according to an intentional output order.

According to the illustrative aspect, if any print command is not stored in the buffer, an output determined command (specifically, a job start command) is output without being stored in the buffer. Therefore, the output determined command can be output to the printer 2 at an earlier timing. Accordingly, the printer 2 starts execution of the processing based on the output determined command at an earlier timing.

If a print command is stored in the buffer, an output determined command (specifically, a job end command) is stored in the buffer. Therefore, the output determined command is not output to the printer 2 prior to output undetermined commands that have been generated before the output determined command.

According to the illustrative aspect, when the stored print command is output and if the print command stored after the output print command is an output determined command (specifically, a job end command), the output determined command is automatically output. The output determined command is stored in the buffer so as not to be output prior to the print commands that have been previously stored in the buffer, and the output determined command is automatically output if all the print commands previously stored in the buffer are erased by outputting or deleting. The output determined command is output automatically, and this omits processing determination and a print command can be effectively output.

<Other Illustrative Aspects>

The present invention is not limited to the aspects explained in the above description made with reference to the drawings. The following aspects may be included in the technical scope of the present invention, for example.

(1) In the above illustrative aspect, the command identifier is added to a print command such that a kind of print command can be determined. However, if a kind of print command can be determined from the stored print command itself, the command identifier may not be added.

(2) In the above illustrative aspect, when a print command having a different kind from the previously generated print command is generated, an inquiry is made. However, an inquiry may be made for processing determination every time a print command is generated.

(3) In the above illustrative aspect, if any one of print commands is determined to be stored, an inquiry is not made to the processing determination section for the print commands that are stored after the print command that has been determined to be stored. However, in such a case, an inquiry may be made and the determination result should be keeping storing.

(4) In the above illustrative aspect, when the print command is an output determined command, the print command is output to the printer if any print command is not stored in the buffer. However, even if any print command is not stored in the buffer, the output determined command may be stored in the buffer. Namely, the generated print command may be always stored in the buffer.

(5) In the above illustrative aspect, data of one page is divided into a plurality of areas and a print command is generated for every area. However, a print command may be generated for every data of one page. In such a case, timing for generating a successive paper feed command may not be designated by the area, for example the area before a last area, but may be designated by the line number.

(6) In the above illustrative aspects, the CPU 11 functions as the generation section, the storing section, the determination/processing section, the processing determination section, and the inquiry/processing section according to the corresponding module. However, a separate CPU may be provided for each of the sections.

What is claimed is:

1. A non-transitory computer readable medium having stored a computer program product thereon for configuring a print controller to perform as:
   a generation section configured to generate a print command based on printing object data that is sequentially input;
   a storing section configured to store the print command in a memory without outputting to an image forming section;
   a determination section configured to determine which one of processing including outputting, deleting and keep storing is executed for the print command stored in the memory based on a content of printing object data that is input after the printing object data for which the print command has been generated; and
   an execution section configured to execute the processing that is determined by the determination section for the stored print command, wherein the determination section further includes:
      a processing determination section configured to receive an inquiry about the processing for the stored print command and determine the processing for the inquired print command according to a kind of the print command; and
      an inquiry section configured to inquire the processing determination section about the processing for the print command.

2. The non-transitory computer readable medium according to claim 1,
   wherein the storing section adds a command identifier to a print command, the command identifier representing a kind of the print command; and
   wherein the processing determination section determines a kind of a print command with reference to the command identifier added to the print command.

3. The non-transitory computer readable medium according to claim 1, wherein the inquiry section inquires of the processing determination section about the processing on condition that a print command having a different kind from a previously generated print command is generated.

4. The non-transitory computer readable medium according to claim 1, wherein the inquiry section repeatedly inquires of the processing determination section about the processing for a print command sequentially from a previously stored print command when the processing determination section determines that any one of the stored print commands is keep storing.

5. The non-transitory computer readable medium according to claim 1,
   wherein the generation section generates a determined output command and an undetermined output command, the determined output command being determined to be output to the image forming section and the undetermined output command not being determined to be output to the image forming section; and
   wherein when the print command generated by the generation section is an undetermined output command, the storing section stores the print command in the memory without outputting to the image forming section, and when the print command is a determined output command and if no print command is stored in the memory, the storing section outputs the generated print command to the image forming section, and when the print command is a determined output command and if any print command is stored in the memory, the storing section stores the generated print command in the memory.

6. The non-transitory computer readable medium according to claim 5,
   wherein the storing section stores a print command in the memory so as to be recognizable that the print command is either a determined output command or an undetermined output command; and
   wherein after the execution section outputs the stored print command and if its succeeding print command stored in the memory is a determined output command, the execution section automatically outputs the determined output command.

7. A print controller comprising:
   a generation section configured to generate a print command based on printing object data that is sequentially input;
   a storing section configured to store the print command in a memory without outputting to an image forming section;
   a determination section configured to determine which one of processing including outputting, deleting and keep storing is executed for the stored print command based on a content of printing object data that is input after the printing object data for which the print command has been generated; and
   an execution section configured to execute the processing that is determined by the determination section for the stored print command, wherein the determination section further includes:
      a processing determination section configured to receive an inquiry about the processing for the stored print command and determine the processing for the inquired print command according to a kind of the print command; and
      an inquiry section configured to inquire the processing determination section about the processing for the print command.

8. The print controller according to claim 7,
   wherein the storing section adds a command identifier to a print command, the command identifier representing a kind of the print command; and
   wherein the processing determination section determines a kind of a print command with reference to the command identifier added to the print command.

9. The print controller according to claim 7, wherein the inquiry section inquires of the processing determination section about the processing on condition that a print command having a different kind from a previously generated print command is generated.

10. The print controller according to claim 7, wherein the inquiry section repeatedly inquires of the processing determination section about the processing for a print command sequentially from a previously stored print command when the processing determination section determines that any one of the stored print commands is keep storing.

11. The print controller according to claim 7,
    wherein the generation section generates a determined output command and an undetermined output command, the determined output command being determined to be output to the image forming section and the undetermined output command not being determined to be output to the image forming section; and wherein when the print command generated by the generation section is an undetermined output command, the storing section stores the print command in the memory without outputting to the image forming section, and when the print command is a determined output command and if no print command is stored in the memory, the storing section outputs the generated print command to the image forming section, and when the print command is a determined output command and if any print command is stored in the memory, the storing section stores the generated print command in the memory.

12. The print controller according to claim 11, wherein the storing section stores a print command in the memory so as to be recognizable that the print command is either a determined output command or an undetermined output command; and wherein after the execution section outputs the stored print command, if its succeeding print command stored in the memory is a determined output command, the execution section automatically outputs the determined output command.

13. A computer executable method for controlling a printing operation, the method comprising steps of:

a generating step of generating a print command based on printing object data that is sequentially input;

a storing step of storing the print command in a memory without outputting to an image forming section;

a determining step of determining which one of processing including outputting, deleting and keep storing is executed for the stored print command based on a content of printing object data that is input after the printing object data for which the print command has been generated; and an executing step of executing the processing that is determined at the determining step for the stored print command, wherein the determining step further includes:

receiving an inquiry about the processing for the stored print command and determining the processing for the inquired print command according to a kind of the print command; and inquiring about the processing for the print command.

14. The computer executable method according to claim 13, wherein a command identifier is added to a print command at the storing step, the command identifier representing a kind of the print command; and wherein a kind of a print command is determined with reference to the command identifier added to the print command at the processing determining step.

15. The computer executable method according to claim 13, wherein the inquiring step further includes a step of inquiring at the processing determining step about the processing on condition that a print command having a different kind from a previously generated print command is generated.

16. The computer executable method according to claim 13, wherein the inquiring step further includes a step of repeatedly inquiring at the processing determining step about the processing for a print command sequentially from a previously stored print command when it is determined that any one of the stored print commands is keep storing at the processing determining step.

17. The computer executable method according to claim 13, wherein a determined output command and an undetermined output command are generated at the generating step, the determined output command being determined to be output to the image forming section and the undetermined output command not being determined to be output to the image forming section; and wherein when the print command generated at the generating step is an undetermined output command, the print command is stored in the memory without outputting to the image forming section at the storing step, and when the print command is a determined output command and if no print command is stored in the memory, the generated print command is output to the image forming section at the storing step, and when the print command is a determined output command and if any print command is stored in the memory, the generated print command is stored in the memory at the storing step.

* * * * *

UNITED STATES PATENT AND TRADEMARK OFFICE
CERTIFICATE OF CORRECTION

| | |
|---|---|
| PATENT NO. | : 8,614,817 B2 |
| APPLICATION NO. | : 12/952818 |
| DATED | : December 24, 2013 |
| INVENTOR(S) | : Yuji Miyata |

It is certified that error appears in the above-identified patent and that said Letters Patent is hereby corrected as shown below:

Claims

Column 18, Claim 17, Line 35:
   Please delete "if no print" and replace with --if any print--

Signed and Sealed this
Tenth Day of November, 2015

Michelle K. Lee
*Director of the United States Patent and Trademark Office*